United States Patent
Luo et al.

(10) Patent No.: US 12,291,104 B1
(45) Date of Patent: May 6, 2025

(54) SYSTEM FOR MUTUAL INDUCTANCE CANCELLATION FOR T-TYPE MULTILEVEL CONVERTERS

(71) Applicant: GM GLOBAL TECHNOLOGY OPERATIONS LLC, Detroit, MI (US)

(72) Inventors: Yilun Luo, Ann Arbor, MI (US); Junghoon Kim, Springboro, OH (US); Khorshed Mohammed Alam, Canton, MI (US); Chandra S. Namuduri, Troy, MI (US); Rashmi Prasad, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 18/501,340

(22) Filed: Nov. 3, 2023

(51) Int. Cl.
| | |
|---|---|
| *H02M 7/42* | (2006.01) |
| *B60L 15/00* | (2006.01) |
| *H02M 1/088* | (2006.01) |
| *H02M 1/12* | (2006.01) |
| *H02M 7/483* | (2007.01) |

(52) U.S. Cl.
CPC ............ *B60L 15/007* (2013.01); *H02M 1/088* (2013.01); *H02M 1/12* (2013.01); *H02M 7/483* (2013.01); *B60L 2210/42* (2013.01)

(58) Field of Classification Search
CPC .................................................. B60L 15/007
See application file for complete search history.

(56) References Cited

U.S. PATENT DOCUMENTS

| | | | |
|---|---|---|---|
| 12,172,548 B2 * | 12/2024 | Ling | ................. B60L 58/27 |
| 2016/0043659 A1 | 2/2016 | Xu et al. | |
| 2016/0141962 A1 | 5/2016 | Outram et al. | |
| 2017/0353137 A1 | 12/2017 | Pan et al. | |
| 2018/0097452 A1 * | 4/2018 | Chapman | ............. H02M 7/493 |
| 2018/0248493 A1 | 8/2018 | Mihalache | |

(Continued)

FOREIGN PATENT DOCUMENTS

| | | |
|---|---|---|
| DE | 19724356 C1 | 5/1998 |
| DE | 102021114080 A1 | 5/2022 |
| DE | 102021203869 A1 | 10/2022 |

OTHER PUBLICATIONS

Neutral-Point-Less (NPL) Multilevel Inverter Topology With Single DC-Link Capacitor: H-Type Inverter; Mikayla Benson, Xiaofang Dong, Musab Guven, and Kangbeen Lee; Conference Paper, Jun. 2022; DOI: 10.1109/ITEC53557.2022.9813762; Department of Electrical and Computer Engineering; East Lansing, Michigan, 7 pages.

(Continued)

*Primary Examiner* — Jared Fureman
*Assistant Examiner* — Esayas G Yeshaw
(74) *Attorney, Agent, or Firm* — Quinn IP Law

(57) ABSTRACT

A multi-phase power inverter for an electric propulsion system includes a plurality of T-type multilevel power converters arranged between a high-voltage direct current (DC) power supply and an electric machine. Each of the plurality of T-type multilevel power converters is a solid-state integrated circuit that includes a positive DC power bus, a negative DC power bus, a neutral bus, and a plurality of semiconductor switches disposed in a stacked arrangement. The plurality of semiconductor switches is interconnected via the positive DC power bus, the negative DC power bus, and the neutral bus.

20 Claims, 5 Drawing Sheets

(56) References Cited

U.S. PATENT DOCUMENTS

| | | | |
|---|---|---|---|
| 2019/0061537 A1* | 2/2019 | Ge | B60L 50/51 |
| 2019/0348924 A1 | 11/2019 | Kumar et al. | |
| 2021/0234475 A1* | 7/2021 | Banerjee | H02M 7/72 |
| 2021/0297009 A1 | 9/2021 | Liu et al. | |
| 2022/0304185 A1 | 9/2022 | Nishimachi | |
| 2023/0238895 A1 | 7/2023 | Moon et al. | |

OTHER PUBLICATIONS

Comprehensive Electromagnetic Interference Analysis of Neutral-Point-Less (NPL) Multilevel Inverter With Active Common-Mode Voltage Cancellation; Kangbeen Lee, Mikayla Benson, Mostafa Fereydoonian, and Xiaofeng Dong; Conference Paper, Mar. 2023; DOI: 10.1109/APEC43580.2023.10131636.

* cited by examiner

SYSTEM FOR MUTUAL INDUCTANCE CANCELLATION FOR T-TYPE MULTILEVEL CONVERTERS

INTRODUCTION

The concepts described herein relate generally to vehicles employing electrified powertrain or propulsion systems, which are composed with direct current (DC) power supplies providing electric power to multi-phase power inverters to control operation of one or multiple electric machines.

High-voltage and high-power multilevel inverters (MLIs) have gained attention as the transportation electrification trend is rapidly expanding towards high-capacity mass transit systems such as electric aircraft, trains, and ships. MLIs such as neutral point clamped (NPC) and bi-directional three-phase/three-level (T-type) inverters provide high-voltage and high-power operation capabilities but may require stacked DC-link capacitors with a neutral point connection for zero voltage vector. This neutral point connection to the stacked DC-link capacitor may generate a neutral current oscillating at three times the fundamental frequency, which may cause capacitor voltage imbalance and overvoltage stress on capacitors and switching devices.

A multi-phase inverter circuit may generate an inherent power loop in which high current flows from a DC-link capacitor to a high-side of the multilevel power inverter, then to a low-side of the multilevel power inverter and back. The power loop may generate a magnetic field, which forms parasitic inductance.

As multi-phase power inverters operate at higher switching frequencies, even small levels of parasitic inductance may lead to issues, for example, but not limited to, ringing and/or electromagnetic interference (EMI).

The current flow path determines the size of the power loop, which determines the size of the magnetic field generated, and hence the size of the parasitic inductance, and the current flow path is defined by the topology of the circuit, the topology of the circuit may affect the size of the parasitic inductance.

SUMMARY

In view of the above discussion, it is useful to develop a system and method of mutual inductance cancellation for a multi-phase power inverter including a plurality of T-type multilevel power converters having a topology that reduces parasitic inductance within the multi-phase power inverter.

The concepts disclosed herein relate to a system for a multi-phase power inverter for an electric drivetrain that includes a plurality of T-type multilevel power converters arranged between a high-voltage direct current (DC) power supply and an electric machine, wherein each of the plurality of T-type multilevel power converters is a solid-state integrated circuit (IC) includes: a positive DC power bus; a negative DC power bus; a neutral bus; and a plurality of semiconductor switch switches disposed in a stacked arrangement. The plurality of semiconductor switch switches are interconnected via the positive DC power bus, the negative DC power bus, and the neutral bus, the plurality of semiconductor switch switches including: a first semiconductor switch connected to a first node; a second semiconductor switch connected to the first semiconductor switch at the first node, wherein the first semiconductor switch is arranged in series with the second semiconductor switch between the positive DC power bus and the negative DC power bus; a third semiconductor switch connected to the first node; a fourth semiconductor switch arranged in series with the third semiconductor switch via the neutral bus; and an alternating current (AC) bus connected to the first node, wherein the AC bus is connected to the electric machine; a first heat sink adjoined to at least one of the positive DC power bus and/or the negative DC power bus of the solid-state IC via a first direct bonded copper (DBC) substrate; and a second heat sink adjoined to the neutral bus of the solid-state IC via a second DBC substrate.

Another aspect of the disclosure may include the stacked arrangement including a first tier composed of the first semiconductor switch arranged coplanar with the second semiconductor switch; and a second tier composed of the third semiconductor switch arranged coplanar with the fourth semiconductor switch, wherein the first tier is arranged in parallel with the second tier.

Another aspect of the disclosure may include the positive DC power bus and the negative DC power bus being arranged on a first end of the T-type multilevel power converter, and wherein the AC bus is arranged on a second end of the T-type multilevel power converter.

Another aspect of the disclosure may include the AC bus being arranged in parallel with at least one of the positive DC power bus, the negative DC power bus, and/or the neutral bus.

Another aspect of the disclosure may include the first semiconductor switch, and the second semiconductor switch each being a gallium nitride (GaN) device.

Another aspect of the disclosure may include the third semiconductor switch and the fourth semiconductor switch each being an insulated-gate bipolar transistor (IGBT).

Another aspect of the disclosure may include the stack having: a first tier composed of the first semiconductor switch; a second tier composed of the third semiconductor switch arranged coplanar with the fourth semiconductor switch, wherein the second tier is arranged parallel to the first tier; and a third tier composed of the second semiconductor switch, wherein the third tier is arranged in parallel with the second tier.

Another aspect of the disclosure may include the positive DC power bus and the negative DC power bus being arranged on a first end of the T-type multilevel power converter, and wherein the AC bus is arranged on a second end of the T-type multilevel power converter.

Another aspect of the disclosure may include the AC bus being arranged in parallel with at least one of the positive DC power bus, the negative DC power bus, and/or the neutral bus.

Another aspect of the disclosure may include a T-type multilevel power converter for a multi-phase power inverter for an electric propulsion system that includes a solid-state integrated circuit (IC) having: a positive DC power bus; a negative DC power bus; a neutral bus; a plurality of semiconductor switches disposed in a stacked arrangement, wherein the plurality of semiconductor switches are interconnected via the positive DC power bus, the negative DC power bus, and the neutral bus, the plurality of semiconductor switches including: a first semiconductor switch connected at a first node; a second semiconductor switch connected to the first semiconductor switch at the first node, wherein the first semiconductor switch is arranged in series with the second semiconductor switch between the positive DC power bus and the negative DC power bus; a third semiconductor switch connected at the first node; a fourth semiconductor switch arranged in series with the third semiconductor switch via the neutral bus; and an AC bus connected to the first node; a first heat sink adjoined to at least one of the positive DC power bus and/or the negative DC power bus of the solid-state IC via a first direct bonded copper (DBC) substrate; and a second heat sink adjoined to the neutral bus of the solid-state IC via a second DBC substrate.

Another aspect of the disclosure may include an electrified vehicle including an electric propulsion system, including: an electric motor configured to provide power to a vehicle driveline; a multi-phase power inverter including a plurality of T-type multilevel power converters arranged between a high-voltage direct current (DC) power supply and the electric motor, wherein each of the plurality of T-type multilevel power converters is a solid-state integrated circuit (IC) including: a positive DC power bus; a negative DC power bus; a neutral bus; a plurality of semiconductor switches disposed in a stacked arrangement, wherein the plurality of semiconductor switches are interconnected via the positive DC power bus, the negative DC power bus, and the neutral bus. The plurality of semiconductor switches include a first semiconductor switch connected at a first node; a second semiconductor switch connected to the first semiconductor switch at the first node, wherein the first semiconductor switch is arranged in series with the second semiconductor switch between the positive DC power bus and the negative DC power bus; a third semiconductor switch connected at the first node; a fourth semiconductor switch arranged in series with the third semiconductor switch via the neutral bus; and an AC bus connected to the first node; a first heat sink adjoined to at least one of the positive DC power bus and/or the negative DC power bus of the solid-state IC via a first direct bonded copper (DBC) substrate; and a second heat sink adjoined to the neutral bus of the solid-state IC via a second DBC substrate.

Another aspect of the disclosure may include a method of inductance cancellation in a multi-phase power inverter that includes: arranging a plurality of semiconductor switches in a T-type multilevel stack; assembling the plurality of semiconductor switches, arranged into the T-type multilevel stack, into a solid-state integrated circuit (IC) having: a positive DC power bus; a negative DC power bus; and a neutral bus; and interconnecting the plurality of semiconductor switches via the positive DC power bus, the negative DC power bus, and the neutral bus.

Another aspect of the disclosure may include arranging the plurality of semiconductor switches into a first tier, and a second tier; wherein the first tier is comprised of the first semiconductor switch arranged coplanar with the second semiconductor switch, and the second tier is comprised of the third semiconductor switch arranged coplanar with the fourth semiconductor switch; and wherein the first tier is arranged parallel to the second tier.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
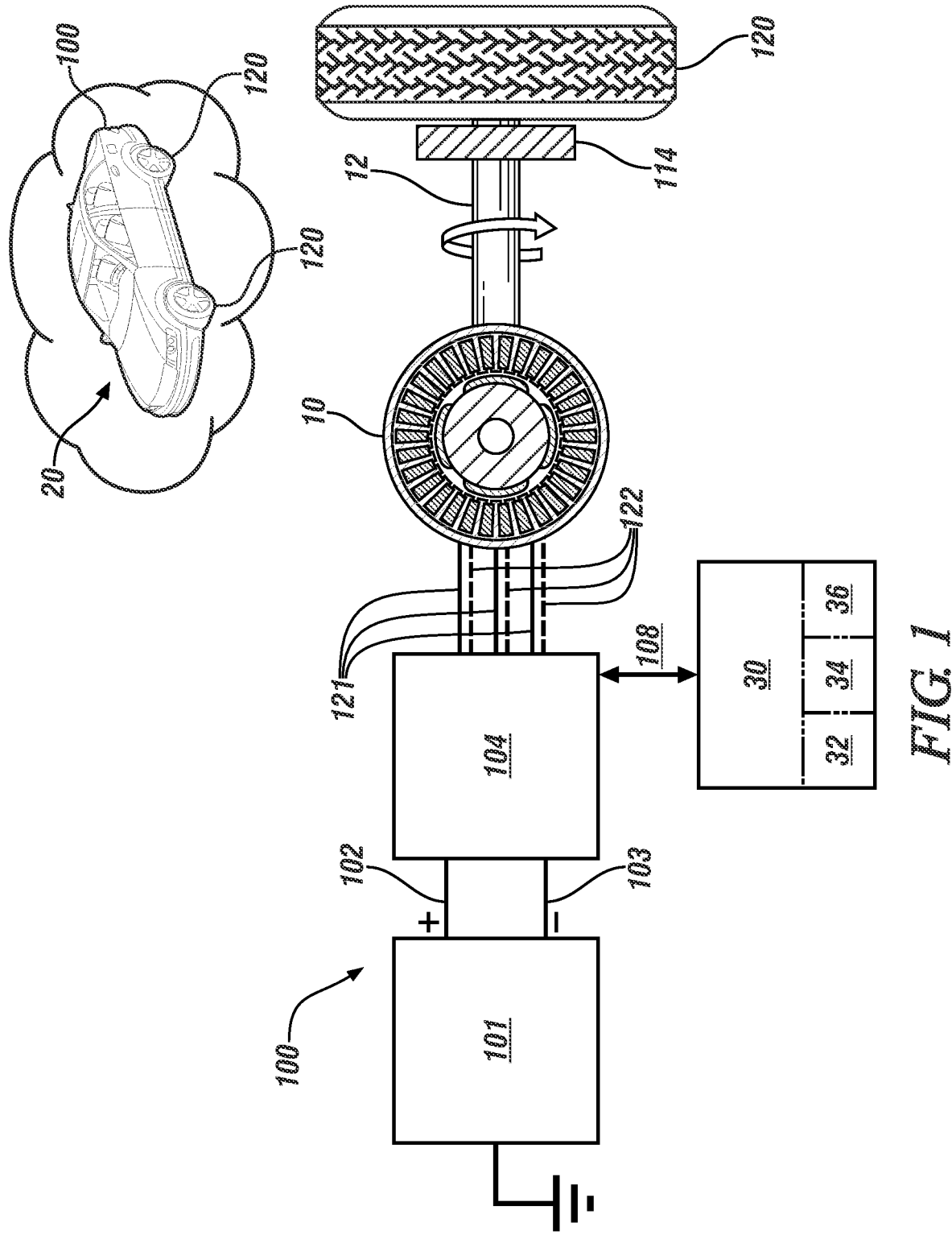
FIG. 1 schematically illustrates an electric drivetrain system including a multi-phase power inverter that is arranged between a high-voltage direct current (DC) power supply and an electric machine, in accordance with the disclosure.

The appended drawings are not necessarily to scale, and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments may be practiced without some of these details. Moreover, for the purpose of clarity, certain technical material that is understood in the related art has not been described in detail to avoid unnecessarily obscuring the disclosure. Furthermore, the disclosure, as illustrated and described herein, may be practiced in the absence of an element that is not specifically disclosed herein.

The present disclosure is susceptible of embodiment in many different forms. Representative examples of the disclosure are shown in the drawings and described herein in detail as non-limiting examples of the disclosed principles. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures, and are not intended to limit the scope of the disclosure.

As used herein, the term "electric machine" refers to an electric motor/generator device including a rotor and a stator that is capable of converting electric power to mechanical power and/or converting mechanical power to electric power by electromagnetic effort.

Figure 2:
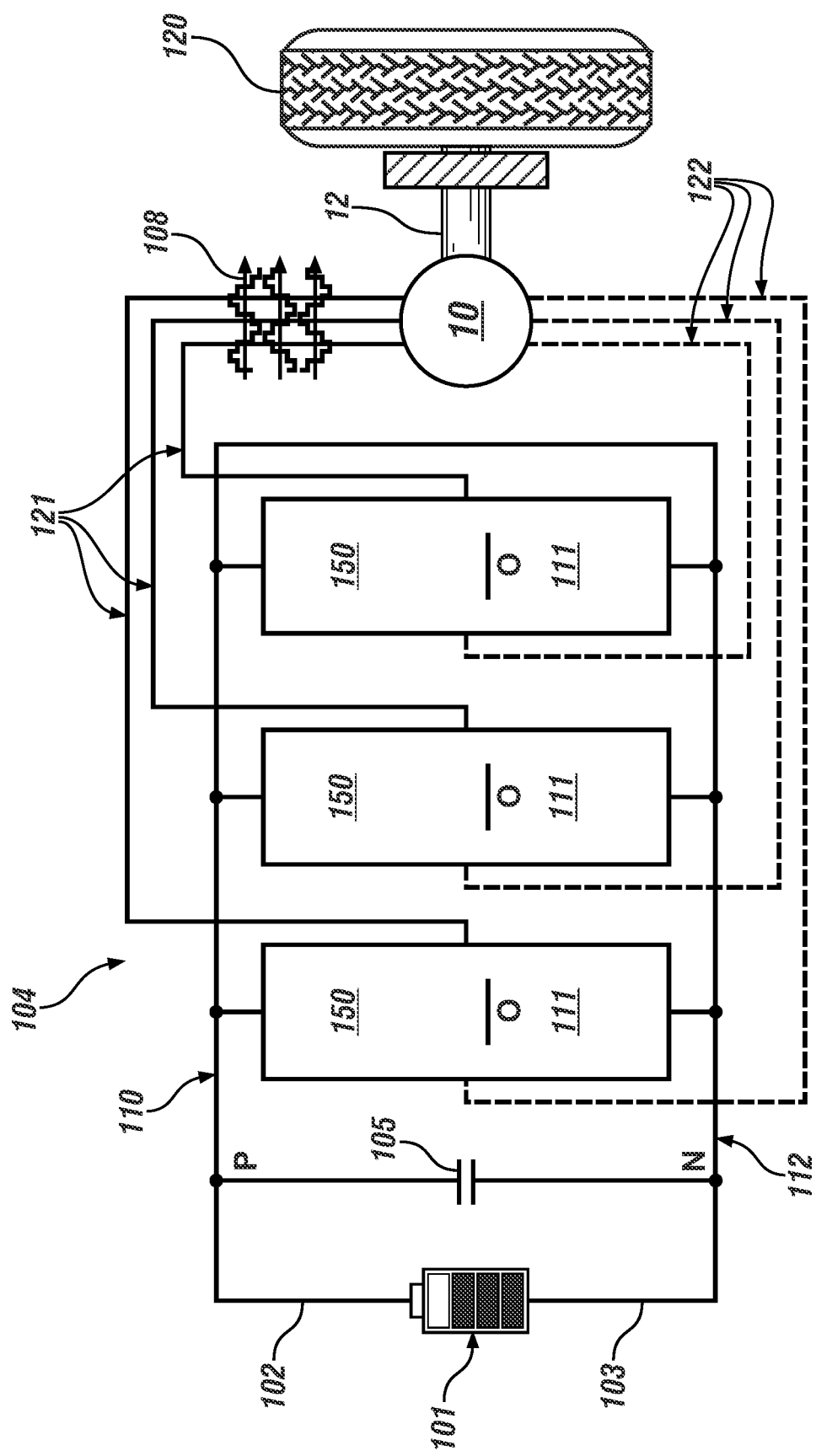
FIG. 2 schematically illustrates an electric drivetrain system including a multi-phase power inverter includes a plurality of T-type multilevel power converters that are arranged between a high-voltage DC power supply and an electric machine, in accordance with the disclosure.

Referring to the drawings, wherein like reference numbers refer to the same or like components in the several Figures, FIGS. 1 and 2 schematically illustrate elements of an electric drivetrain 100 that is composed of a high-voltage direct current (DC) power source 101, a multi-phase power inverter 104, a multi-phase rotary electric motor/generator (electric machine) 10, and a torque actuator 120, the operations of which are monitored and controlled by a controller 30. According to one aspect of the present disclosure, the electric drivetrain 100 is arranged to generate and transfer torque to actuator 120 in the form of one or multiple drive wheels to effect work. Controller 30 executes control routines to control and manage operation of the multi-phase power inverter 104. According to another aspect of the present disclosure, the electric drivetrain 100 is disposed on an electrified vehicle, schematically illustrated at 20, and capable of generating tractive torque for vehicle propulsion. When disposed on the electrified vehicle 20, the electrified vehicle 20 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drivetrain 100 may be an element of a stationary system.

The controller 30 may be embodied as one or more digital computing devices, and may include one or more processors 34 and memory 32. A control routine 36 may be stored as an executable instruction set in the memory 32 and executed by one of the processors 34 of the controller 30. The controller 30 is in communication with the multi-phase power inverter 104 to control operation thereof in response to execution of the control routine 36 to operate the electric machine 10.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital inverters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The electric machine 10 includes a cylindrically-shaped rotor assembly arranged on a rotor shaft and disposed within an annularly-shaped stator, wherein the rotor assembly is coaxial with a rotor opening that is formed in the stator. Other elements of the electric machine 10, e.g., end caps, shaft bearings, electrical connections, etc., are included but not shown. Electrical windings of the stator are arranged with a quantity of electrical phases and a quantity of electrical turns per phase. Depending on the specific arrangement, the quantity of electrical phases may be between 3 and 6, and the quantity of layers of conductors may be between 4 and 12.

The multi-phase power inverter 104 includes a plurality of semiconductor switch switches (illustrated with reference to FIG. 3, et seq.) that are arranged and controllable by the controller 130 to transform DC electric power to alternating current (AC) electric power, and transform AC electric power to DC electric power, employing a pulse-width modulation signal 108 or another control technique. The multi-phase power inverter 104 is arranged and is controllable to transform DC electric power originating from the high-voltage DC power source 101 to AC electric power to actuate the electric machine 10 via electromagnetic effort. The electric machine 10 is controllable to rotate and generate mechanical torque that is transferred via a rotatable member 12 and a geartrain 114 to the actuator 120 when operating in a torque generating mode. The electric machine 10 is controllable by the controller 130 to generate AC electric power from mechanical torque originating at the actuator 120 via electromagnetic effort, which is transformed by the multi-phase power inverter 104 to DC electric power for storage in the high-voltage DC power source 101 when operating in an electric power generating mode. According to one aspect of the disclosure, the actuator 120 includes, a vehicle wheel that transfers torque to a ground surface to effect forward motion as part of a traction propulsion system. The high-voltage DC power source 101 may be in the form of a rechargeable electrochemical battery device, a fuel cell, an ultracapacitor, and/or another electrical energy storage/generation technology.

The high-voltage DC power source 101 may be a rechargeable electrochemical battery device, a fuel cell, an ultracapacitor, and/or another electrical energy storage/generation technology. The high-voltage DC power source 101 connects to the multi-phase power inverter 104 via a high-voltage DC bus having a positive link 102 and a negative link 103, and the multi-phase power inverter 104 connects to the electric machine 10 via a plurality of first AC buses 121 and second AC buses 122 to transfer the pulse-width modulation signal 108.

As illustrated with reference to FIG. 2, the multi-phase power inverter 104 of the electric drivetrain 100 is composed with a plurality of T-type multilevel power converters 150 that are arranged between the high-voltage DC power source 101 and the electric machine 10, with a single DC-link capacitor 105 between the high-voltage DC power source 101 and the multi-phase power inverter 104 of the electric drivetrain 100. As illustrated, and in one non-limiting aspect of the present disclosure, the multi-phase power inverter 104 of the electric drivetrain 100 is composed with a quantity of three of the T-type multilevel power converters 150.

Each of the T-type multilevel power converters 150 is arranged as a solid-state integrated circuit (IC) having a plurality of semiconductor switches that are disposed in a stacked or tiered arrangement.

Other constituent elements of the T-type multilevel power converter 150 includes a positive DC power bus 110, a neutral bus 111, a negative DC power bus 112, and a AC bus 121, along with other elements described herein.

Figure 3:
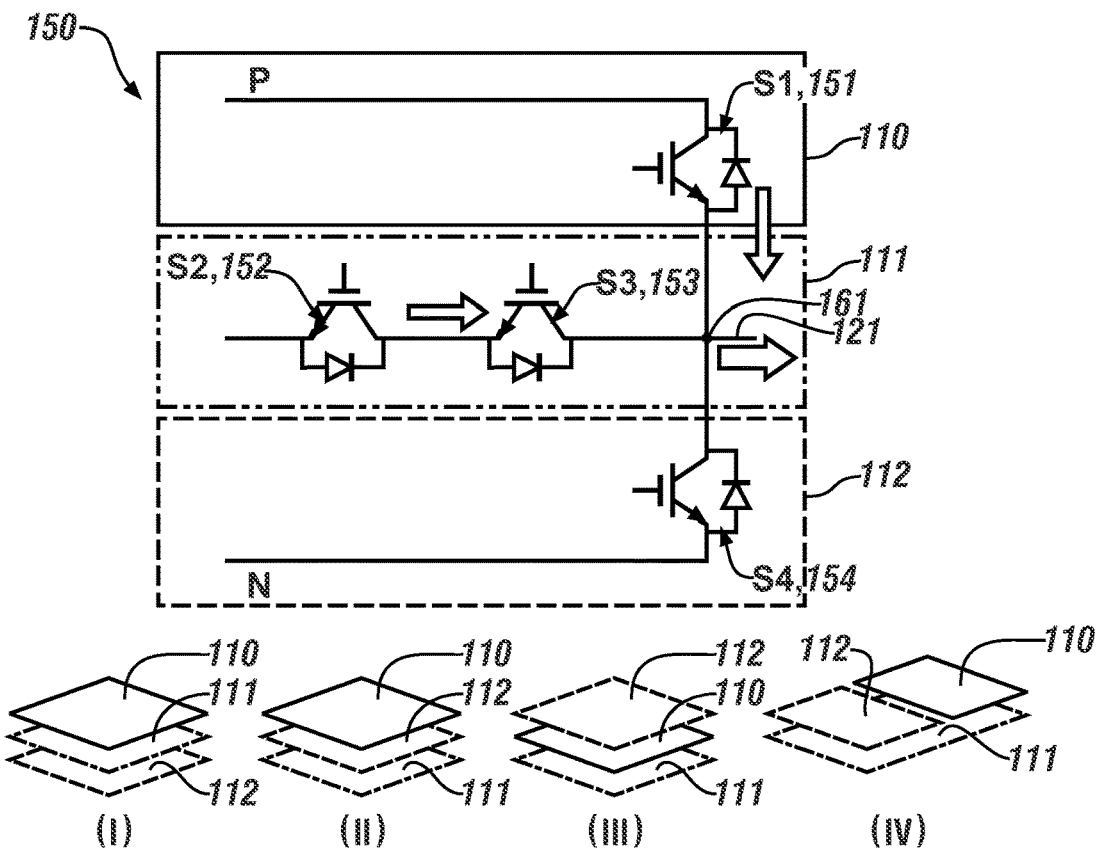
FIG. 3 schematically illustrates a T-type multilevel power converter, in accordance with one aspect of the disclosure.

Referring now to FIG. 3, the topology of each of the T-type multilevel power converters 150 is arranged as a multilevel inverter (MLI). According to one aspect of the present disclosure, and as described herein, each of the T-type multilevel power converters 150 employs a neutral-point-less (NPL) MLI topology. Topology refers to the physical arrangement of the constituent elements, including network busbar interconnects, dielectrics, semiconductor switches, and other elements.

The plurality of semiconductor switches includes, in one aspect of the present disclosure and as shown, a first semiconductor switch S1 151, a second semiconductor switch S2 152, a third semiconductor switch S3 153, and a fourth semiconductor switch S4 154. According to one aspect of the present disclosure, at least a portion of the semiconductor switches are field-effect transistors (FETs). According to another aspect of the present disclosure, the FETs are gallium nitride (GaN) transistors. According to another aspect of the present disclosure, at least a portion of the semiconductor switches are insulated-gate bipolar transistors (IGBTs).

The first semiconductor switch S1 151 is arranged in series with the fourth semiconductor switch S4 154 between the positive DC power bus 110 and the negative DC power bus 112, with the first semiconductor switch S1 151 being connected to the fourth semiconductor switch S4 154 at a first node 161. The third semiconductor switch S3 153 is also connected to the first node 161. The first node 161 connects to the AC bus 121 to transfer power to the electric machine 10 (shown with reference to FIG. 2). The third semiconductor switch S3 153 is arranged in series with the second semiconductor switch S2 152, with the second semiconductor switch S2 152 being connected to the neutral bus 111.

A positive DC power bus 110, a neutral power bus 111, and a negative DC power bus 112, are schematically illustrated.

By configuring the topology within each of the T-type multilevel converters 150 such that both the positive DC power bus 110 and the negative DC power bus 112 are parallel with the neutral bus 111, mutual inductance cancellation minimizes parasitic inductance by coupling positive mutual inductance and negative mutual inductance for commutation loop currents within each of the T-type multilevel converters 150.

According to one aspect of the disclosure, illustrated at (I), the buses are configured, from top 33 to bottom 34, such that the positive DC power bus 110 is parallel to the neutral bus 111, which is then parallel to the negative DC power bus 112.

According to another aspect of the disclosure, as illustrated at (II), the buses are configured, from top 33 to bottom 34, such that the positive DC power bus 110 is parallel to the negative DC power bus 112, which is then parallel to the neutral bus 111.

According to another aspect of the disclosure, as illustrated at (III), the buses are configured, from top 33 to bottom 34, such that the neutral bus 111, is parallel with the positive DC power bus 110, which is then parallel to the negative DC power bus 112.

According to another aspect of the disclosure, as illustrated at (IV), the positive DC power bus 110 is coplanar with the negative DC power bus 112, while both the positive DC power bus 110 and the negative DC power bus 112 are parallel with the neutral bus 111.

While several topologies are discussed above, they are merely exemplary and non-limiting aspects of the disclosure. Accordingly, it should be appreciated that, within each of the T-type multilevel converters 150, mutual inductance cancellation minimizes parasitic inductance by coupling positive mutual inductance and negative mutual inductance for commutation loop currents within each of the T-type multilevel converters 150, i.e., by configuring the topology of the T-type multilevel inverter 150 such that both the positive DC power bus 110 and the negative DC power bus 112 are parallel with the neutral bus 111.

Referring back to FIG. 3, activations and deactivations of the first semiconductor switch S1 151, second semiconductor switch S2 152, third semiconductor switch S3 153, and fourth semiconductor switch S4 154 are controlled by the controller 130 to transform DC electric power to AC electric power, and transform AC electric power to DC electric power, employing the pulse-width modulation signal 108.

Figure 4:
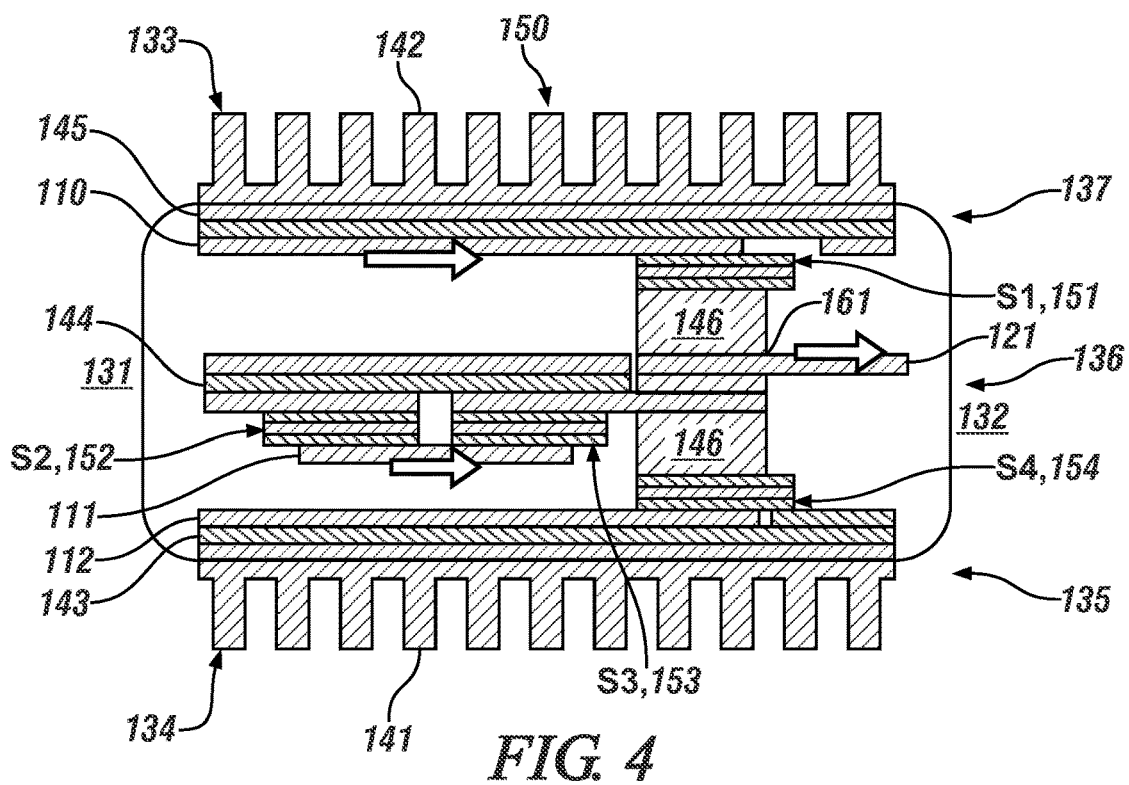
FIG. 4 schematically illustrates a cutaway sideview of a T-type multilevel power converter, in accordance with one aspect of the disclosure.

Referring now to FIG. 4, an aspect of the present disclosure of the T-type multilevel power converter 150 includes a first semiconductor switch S1 151, a second semiconductor switch S2 152, a third semiconductor switch S3 153, a fourth semiconductor switch S4 154, a positive DC power bus 110, a negative DC power bus 112, a neutral bus 111, a first node 161, a first direct bonded copper (DBC) plate 143, a second DBC plate 144, a third DBC plate 145, a plurality of conductive spacers 146, a first heat sink 141, and a second heat sink 142. The positive DC power bus 110 and the negative DC power bus are located at a first end 131 of the T-type multilevel power converter 150 and the AC bus 121 is located at a second end 132, opposite the first end 131 of the T-type multilevel power converter 150. The first node 161 connects to the AC bus 121 to transfer power to one of the phases of the electric machine 10 that is illustrated with reference to FIGS. 1 and 2.

Referring again to FIG. 4, the first semiconductor switch S1 151, second semiconductor switch S2 152, third semiconductor switch S3 153, and fourth semiconductor switch S4 154 are arranged in a stacked or multi-tiered configuration, including a first (lower) tier 135, a second (middle) tier 136, and a third (upper) tier 137. The first tier 135 includes the fourth semiconductor switch S4 154 and, the negative DC power bus 112 arranged on the first DBC plate 143. The second tier 136 includes the second semiconductor switch S2 152 and the third semiconductor switch S3 153 (which are coplanar), the second DBC plate 144, the neutral bus 111, and the AC bus 121. The third tier 137 includes the first semiconductor switch S1 151 and the positive DC power bus 110 arranged on the third DBC plate 145.

The complete stacked arrangement includes, in ascending order from bottom 134 to top 133: the first heat sink 141; the first DBC plate 143; the negative DC power bus 112; the first tier 135 including the second semiconductor switch S2 152 and the fourth semiconductor switch S4 154; the neutral bus 111; the second tier 136 including the fifth semiconductor switch S5 155 and sixth semiconductor switch S6 156, the AC bus 121, a second AC bus 122, the second DBC plate 144, and the plurality of conductive spacers 146; the third tier 137 including the first semiconductor switch S1 151, the third semiconductor switch S3 153, and positive DC power bus 110; the third DBC plate 145; and the second heat sink 142.

The first semiconductor switch S1 151, third semiconductor switch S3 153, and fourth semiconductor switch S4 154 are joined at the first node 161, which is connected to the AC bus 121. The first heat sink 141 is adjoined via the first DBC plate 143, and the second heat sink is adjoined via the third DBC plate 145.

Figure 5:
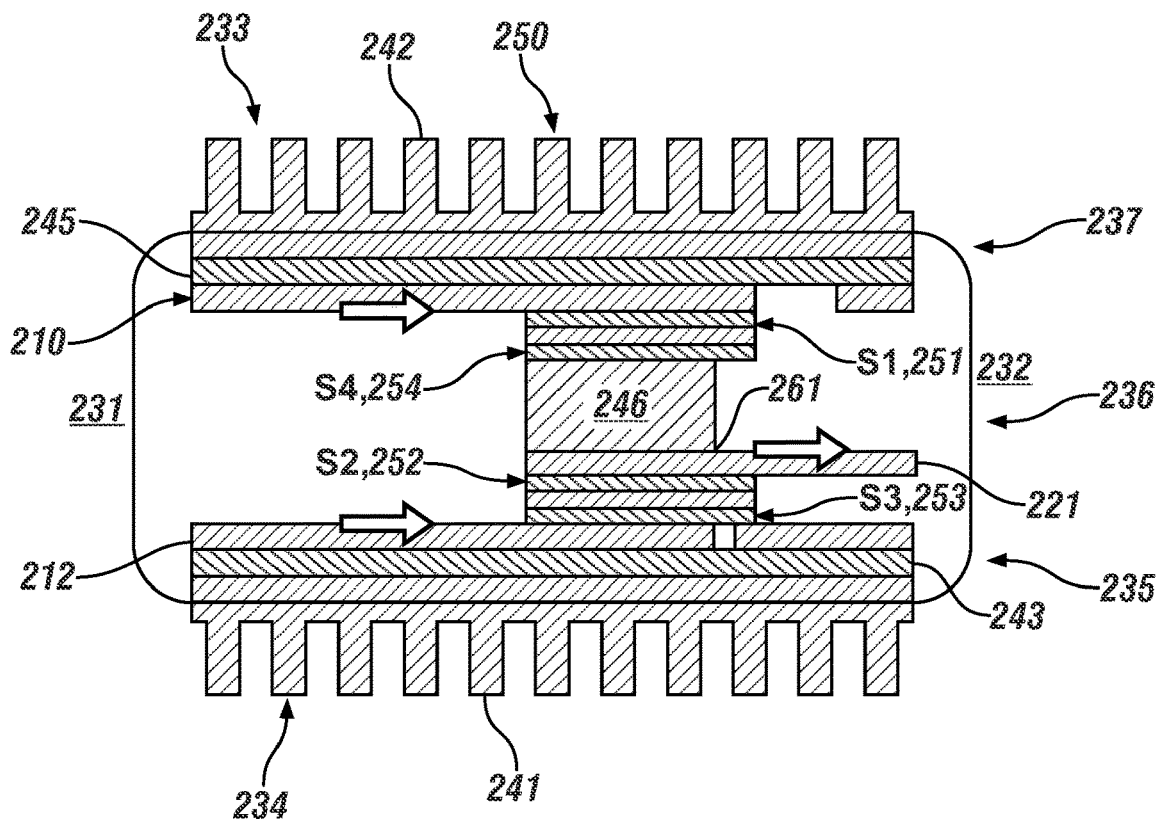
FIG. 5 schematically illustrates a cutaway sideview of a T-type multilevel power converter, in accordance with another aspect of the disclosure.

Referring now to FIG. 5, another aspect of the present disclosure of the T-type multilevel power converter 250 includes a first semiconductor switch S1 251, a second semiconductor switch S2 252, a third semiconductor switch S3 253, a fourth semiconductor switch S4 254, a positive DC power bus 210, a negative DC power bus 212, a neutral bus 211, a first node 261, a first DBC plate 243, a third DBC plate 245, a plurality of conductive spacers 246, a first heat sink 241, and a second heat sink 242. The positive DC power bus 210 and the negative DC power bus 212 are located at a first end 231 of the T-type multilevel power converter 250 and a AC bus 221 is located at a second end 232, opposite the first end 231 of the T-type multilevel power converter 250. The first node 261 connects to the AC bus 221 to transfer power to one of the phases of the electric machine 10 that is illustrated with reference to FIGS. 1 and 2.

Referring again to FIG. 5, the first semiconductor switch S1 251, second semiconductor switch S2 252, third semiconductor switch S3 253, and fourth semiconductor switch S4 254 are arranged in a stacked or multi-tiered configuration, including a first (lower) tier 235, a second (middle) tier 236, and a third (upper) tier 237. The first tier 235 includes the second semiconductor switch S2 252 and the third semiconductor switch S3 253 (which are coplanar), and neutral bus 211 arranged on the first DBC plate 243.

The second tier 236 includes the first node 261 that connects to the AC bus 221.

The third tier 237 includes the first semiconductor switch S1 251 and the fourth semiconductor switch S4 254, the positive DC power bus 210, and the negative DC power bus 212, which are arranged on the third DBC plate 245.

The complete stacked arrangement includes, in ascending order from bottom 234 to top 233, the first heat sink 241, the first DBC plate 243; the first tier 235 including the neutral bus 211, the third semiconductor switch S3 253, and the fourth semiconductor switch S4 254; the second tier 236 including the first node 261 that connects to the AC bus 121; the conductive spacer 246; the third tier 237 including the first semiconductor switch S1 251 and the fourth semiconductor switch S4 254, which are arranged coplanar to one another, the positive DC power bus 210 and the negative DC power bus 212, which are arranged coplanar to one another; the third DBC plate 245; and the second heat sink 242.

The first semiconductor switch S1 251, third semiconductor switch S3 253, and fourth semiconductor switch S4 254 are joined at the first node 261, which is connected to the AC bus 221. The first heat sink 241 is adjoined via the first DBC plate 243, and the second heat sink is adjoined via the third DBC plate 245.

Figure 6:
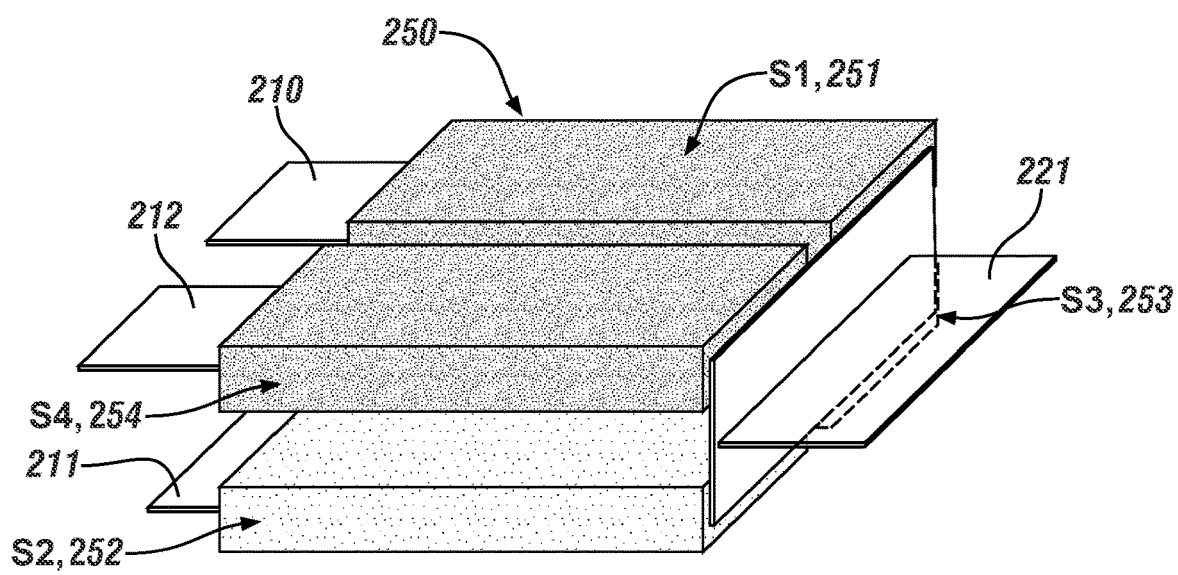
FIG. 6 schematically illustrates an isometric view of an arrangement of elements of a T-type multilevel power converter, in accordance with one aspect of the disclosure.

FIG. 6 schematically illustrates the aspect of the present disclosure of the T-type multilevel power converter 350, and includes the first semiconductor switch S1 351, the second semiconductor switch S2 352, the third semiconductor switch S3 353, the fourth semiconductor switch S4 354, the positive DC power bus 310, and the negative DC power bus 312, which connect to the AC bus 321. It is understood that other elements that have previously described have been omitted, but are included in an aspect of the present disclosure of the T-type multilevel power converter 350 when reduced to practice.

The first semiconductor switch S1 351, the second semiconductor switch S2 352, the third semiconductor switch S3 353, and the fourth semiconductor switch S4 354 are arranged in a stacked or multi-tiered configuration, including a first (lower) tier 335, a second (middle) tier 336, and a third (upper) tier 337. The first tier 335 includes the second semiconductor switch S2 352, and the third semiconductor switch S3 353, which are coplanar. The second tier 336 includes the first node 361 that connects to the AC bus 321. The third tier 337 includes the first semiconductor switch S1 351 and the fourth semiconductor switch S4 354, which are coplanar. The AC bus 321, the positive DC power bus 310, and the negative DC power bus 312 are connected as illustrated, consistent with the arrangement of the circuit that is illustrated with reference to FIG. 3.

Figure 7:
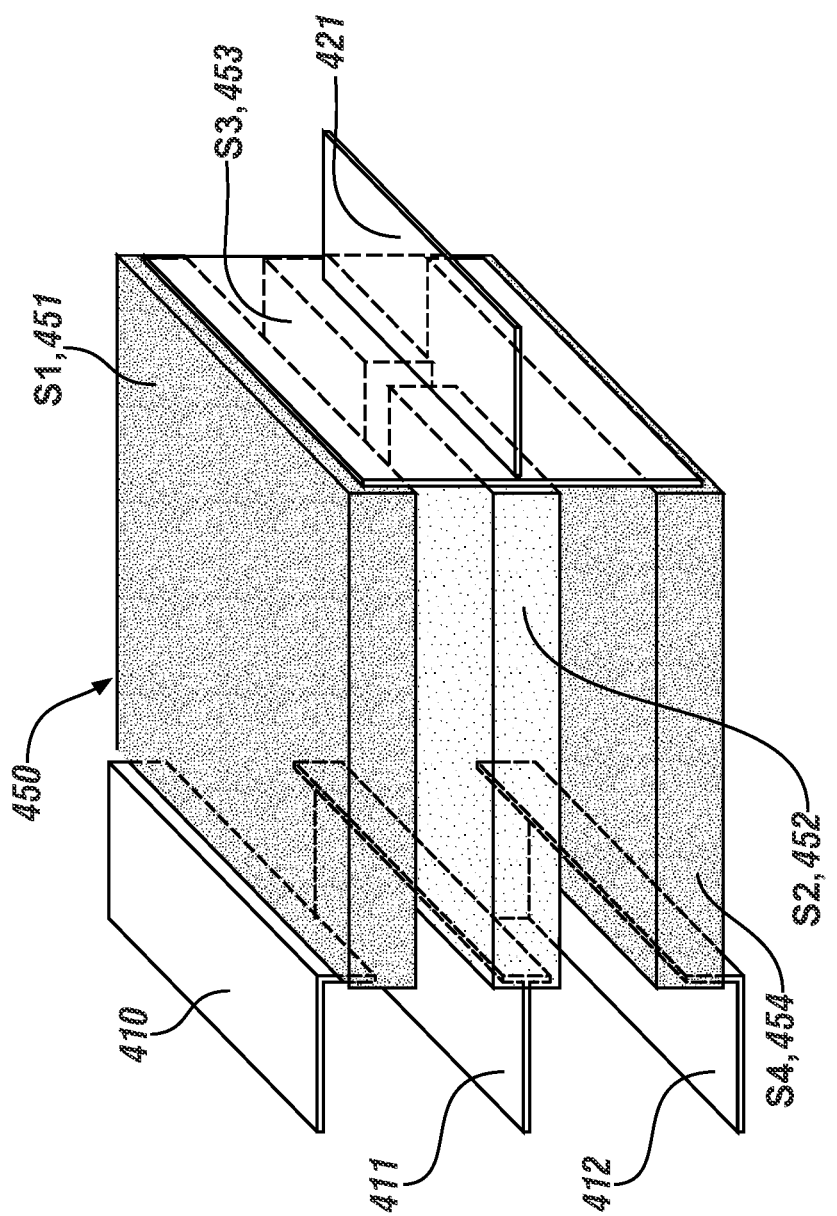
FIG. 7 schematically illustrates an isometric view of an arrangement of elements of a T-type multilevel power converter, in accordance with another aspect of the disclosure.

FIG. 7 schematically illustrates an aspect of the present disclosure of the T-type multilevel power converter 450, and includes the first semiconductor switch S1 451, the second semiconductor switch S2 452, the third semiconductor switch S3 453, the fourth semiconductor switch S4 454, the positive DC power bus 410, and the negative DC power bus 412, which connect to the AC bus 421. It is understood that other elements that have previously described have been omitted, but are included in an aspect of the present disclosure of the T-type multilevel power converter 450 when reduced to practice.

The first semiconductor switch S1 451, the second semiconductor switch S2 452, the third semiconductor switch S3 453, and the fourth semiconductor switch S4 454 are arranged in a stacked or multi-tiered configuration, including a first (lower) tier 435, a second (middle) tier 436, and a third (upper) tier 437. The first tier 435 includes the fourth semiconductor switch S4 454, and the negative DC power bus 412. The second tier includes the second semiconductor S2, 452, and the third semiconductor switch S3 453, which are coplanar, and the AC bus 421, which connects to a first node. The third tier 437 includes the first semiconductor switch S1 451, and the positive DC power bus 410. The AC bus 421, the positive DC power bus 410, and the negative DC power bus 412 are connected as illustrated, consistent with the arrangement of the circuit that is illustrated with reference to FIG. 3.

The illustrated aspects of the present disclosure of the T-type multilevel power converter provide for overlapping of the positive DC power bus, the neutral bus, and the negative DC power bus to reduce mutual inductance. This arrangement includes overlaying the AC bus on the second AC bus to cancel dV/dt and reduce or eliminate electromagnetic interference and achieve field cancellation via the P, 0, and N currents to minimize parasitic loop and stray inductances.

The concepts and aspects of the present disclosure described herein facilitate optimal design of the positive DC power bus, negative DC power bus, neutral bus, and the DC-link capacitor to achieve mutual inductance cancellation.

The concepts and aspects of the present disclosure described herein facilitate various heat transfer and cooling systems, including direct cooling, indirect cooling, immersive cooling, single-sided or double-sided cooling.

The concepts and aspects of the present disclosure described herein facilitate a reduction in voltage/current overshoot for device stress, including die/power module, bus bars, DC-link capacitor.

The concepts and aspects of the present disclosure described herein facilitate size reduction and increased power density compared to current systems.

The concepts and aspects of the present disclosure described herein facilitate use of lower voltage rating semiconductor switch dies for lower conduction loss and increased EV range compared to current systems.

The concepts and aspects of the present disclosure described herein facilitate reduced ringing and radiative/conductive electromagnetic interference to other sub-systems.

The concepts and aspects of the present disclosure described herein facilitate higher switching speed which reduces loss and hence increases vehicle range and current capability.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other examples for carrying out the present teachings have been described in detail, various alternative designs and aspect of the present disclosures exist for practicing the present teachings defined in the appended claims.

What is claimed is:

1. A multi-phase power inverter for an electric drivetrain, the multi-phase power inverter comprising:
    a plurality of T-type multilevel power converters arranged between a high-voltage DC power supply and an electric machine, wherein each of the plurality of T-type multilevel power converters is a solid-state integrated circuit (IC) including:
        a positive DC power bus;
        a negative DC power bus;
        a neutral bus;
        a plurality of semiconductor switches disposed in a stacked arrangement, wherein the plurality of semiconductor switches is interconnected via the positive DC power bus, the negative DC power bus, and the neutral bus, the plurality of semiconductor switches including:
            a first semiconductor switch connected to a first node;
            a second semiconductor switch connected to the first semiconductor switch at the first node, wherein the first semiconductor switch is arranged in series with the second semiconductor switch between the positive DC power bus and the negative DC power bus;
            a third semiconductor switch connected to the first node;
            a fourth semiconductor switch arranged in series with the third semiconductor switch via the neutral bus; and
        an AC bus connected to the first node, wherein the AC bus is connected to the electric machine;
    a first heat sink adjoined to at least one of the positive DC power bus and/or the negative DC power bus of the solid-state IC via a first direct bonded copper (DBC) substrate; and
    a second heat sink adjoined to the neutral bus of the solid-state IC via a second DBC substrate.

2. The multi-phase power inverter as recited in claim 1, wherein the stacked arrangement includes a stack having:
    a first tier composed of the first semiconductor switch arranged coplanar with the second semiconductor switch; and
    a second tier composed of the third semiconductor switch arranged coplanar with the fourth semiconductor switch, wherein the first tier is arranged in parallel with the second tier.

3. The multi-phase power inverter as recited in claim 2, wherein the positive DC power bus and the negative DC power bus are arranged on a first end of the T-type multilevel power converter, and wherein the AC bus is arranged on a second end of the T-type multilevel power converter.

4. The multi-phase power inverter as recited in claim 3, wherein the AC bus is arranged in parallel with at least one of the positive DC power bus, the negative DC power bus, and/or the neutral bus.

5. The multi-phase power inverter as recited in claim 2, wherein the first semiconductor switch, and the second semiconductor switch each comprise a gallium nitride (GaN) device.

6. The multi-phase power inverter as recited in claim 2, wherein the third semiconductor switch, and the fourth semiconductor switch each comprises an insulated-gate bipolar transistor (IGBT).

7. The multi-phase power inverter as recited in claim 1, wherein the stacked arrangement includes a stack having:
    a first tier composed of the first semiconductor switch;
    a second tier composed of the third semiconductor switch arranged coplanar with the fourth semiconductor switch, wherein the second tier is arranged parallel to the first tier; and
    a third tier composed of the second semiconductor switch, wherein the third tier is arranged in parallel with the second tier.

8. The multi-phase power inverter as recited in claim 7, wherein the positive DC power bus and the negative DC power bus are arranged on a first end of the T-type multilevel power converter, and wherein the AC bus is arranged on a second end of the T-type multilevel power converter.

9. The multi-phase power inverter as recited in claim 8, wherein the AC bus is arranged in parallel with at least one of the positive DC power bus, the negative DC power bus, and/or the neutral bus.

10. The multi-phase power inverter as recited in claim 7, wherein the first semiconductor switch, and the second semiconductor switch each comprise a gallium nitride (GaN) device.

11. The multi-phase power inverter as recited in claim 7, wherein the third semiconductor switch, and the fourth semiconductor switch each comprises an insulated-gate bipolar transistor (IGBT).

12. A T-type multilevel power converter for a multi-phase power inverter for an electric propulsion system, the T-type multilevel power converter comprising:
    a solid-state integrated circuit (IC) having:
        a positive DC power bus;
        a negative DC power bus;
        a neutral bus;
        a plurality of semiconductor switches disposed in a stacked arrangement, wherein the plurality of semiconductor switches is interconnected via the positive DC power bus, the negative DC power bus, and the neutral bus, the plurality of semiconductor switches including:
  a first semiconductor switch connected at a first node;
  a second semiconductor switch connected to the first semiconductor switch at the first node, wherein the first semiconductor switch is arranged in series with the second semiconductor switch between the positive DC power bus and the negative DC power bus;
  a third semiconductor switch connected at the first node;
  a fourth semiconductor switch arranged in series with the third semiconductor switch via the neutral bus; and
an AC bus connected to the first node;
a first heat sink adjoined to at least one of the positive DC power bus and/or the negative DC power bus of the solid-state IC via a first direct bonded copper (DBC) substrate; and
  a second heat sink adjoined to the neutral bus of the solid-state IC via a second DBC substrate.

13. The T-type multilevel power converter as recited in claim 12, wherein the stacked arrangement includes a stack having:
  a first tier composed of the first semiconductor switch arranged coplanar with the second semiconductor switch; and
  a second tier composed of the third semiconductor switch arranged coplanar with the fourth semiconductor switch, wherein the first tier is arranged in parallel with the second tier.

14. The T-type multilevel power converter as recited in claim 12, wherein the stacked arrangement includes a stack having:
  a first tier composed of the first semiconductor switch;
  a second tier composed of the third semiconductor switch arranged coplanar with the fourth semiconductor switch, wherein the second tier is arranged parallel to the first tier; and
  a third tier composed of the second semiconductor switch, wherein the third tier is arranged in parallel with the second tier.

15. The T-type multilevel power converter as recited in claim 12, wherein the first semiconductor switch, and the second semiconductor switch each comprises a gallium nitride (GaN) device.

16. The T-type multilevel power converter as recited in claim 12, wherein the third semiconductor switch, and the fourth semiconductor switch each comprises an insulated-bipolar transistor (IGBT).

17. An electrified vehicle, comprising:
an electric propulsion system, including:
  an electric motor configured to provide power to a vehicle driveline;
  a multi-phase power inverter including a plurality of T-type multilevel power converters arranged between a high-voltage direct current (DC) power supply and the electric motor, wherein each of the plurality of T-type multilevel power converters is a solid-state integrated circuit (IC) including:
    a positive DC power bus;
    a negative DC power bus;
    a neutral bus;
    a plurality of semiconductor switches disposed in a stacked arrangement, wherein the plurality of semiconductor switches is interconnected via the positive DC power bus, the negative DC power bus, and the neutral bus, the plurality of semiconductor switches including:
      a first semiconductor switch connected at a first node;
      a second semiconductor switch connected to the first semiconductor switch at the first node, wherein the first semiconductor switch is arranged in series with the second semiconductor switch between the positive DC power bus and the negative DC power bus;
      a third semiconductor switch connected at the first node;
      a fourth semiconductor switch arranged in series with the third semiconductor switch via the neutral bus; and
    an AC bus connected to the first node;
    a first heat sink adjoined to at least one of the positive DC power bus and/or the negative DC power bus of the solid-state IC via a first direct bonded copper (DBC) substrate; and
    a second heat sink adjoined to the neutral bus of the solid-state IC via a second DBC substrate.

18. The electrified vehicle as recited in claim 17, wherein the stacked arrangement includes a stack having:
  a first tier composed of the first semiconductor switch arranged coplanar with the second semiconductor switch; and
  a second tier composed of the third semiconductor switch arranged coplanar with the fourth semiconductor switch, wherein the first tier is arranged in parallel with the second tier.

19. The electrified vehicle as recited in claim 17, wherein the stacked arrangement includes a stack having:
  a first tier composed of the first semiconductor switch;
  a second tier composed of the third semiconductor switch arranged coplanar with the fourth semiconductor switch, wherein the second tier is arranged parallel to the first tier; and
  a third tier composed of the second semiconductor switch, wherein the third tier is arranged in parallel with the second tier.

20. The electrified vehicle as recited in claim 17, wherein the first semiconductor switch, and the second semiconductor switch, each comprises a gallium nitride (GaN) device; and
wherein the third semiconductor switch, and the fourth semiconductor switch each comprises an insulated-bipolar transistor (IGBT).

\* \* \* \* \*